Sept. 28, 1926.  1,601,283
H. F. ATKINS
WELDING MACHINE
Filed Dec. 12, 1923   2 Sheets-Sheet 1

H. F. Atkins, Inv.,
by C. A. Snow & Co.,
Attys.

Sept. 28, 1926.

H. F. ATKINS 1,601,283

WELDING MACHINE

Filed Dec. 12, 1923

Patented Sept. 28, 1926.

1,601,283

UNITED STATES PATENT OFFICE.

HARRY FREDERICK ATKINS, OF PETERBOROUGH, ENGLAND, ASSIGNOR TO THE BRITISH CUTLERY RESEARCH ASSOCIATION, OF SHEFFIELD, ENGLAND.

WELDING MACHINE.

Application filed December 12, 1923, Serial No. 680,217, and in Great Britain January 15, 1923.

This invention comprises certain improvements in the process of and means for simultaneously effecting a plurality of welded joints.

According to the present improvements, a number of welded joints are simultaneously made in such a manner that the fusing of the metal at each joint is effected by a separate current. For instance, two outer parts are electrically welded to a central part by passing the current from one transformer through the central part to one of the outer parts, and the current from another transformer passes through the same central part to the other of the outer parts. With such an arrangement the welding operation at each joint can be independently controlled. By this invention also a machine is constructed carrying a number of sets of jigs for holding the parts to be welded, each set of jigs being successively adapted to be moved into position for enabling the said welding operation to take place. The machine is also adapted to automatically control the switching "on" or "off" of the current.

Referring to the drawings.

Figure 1:
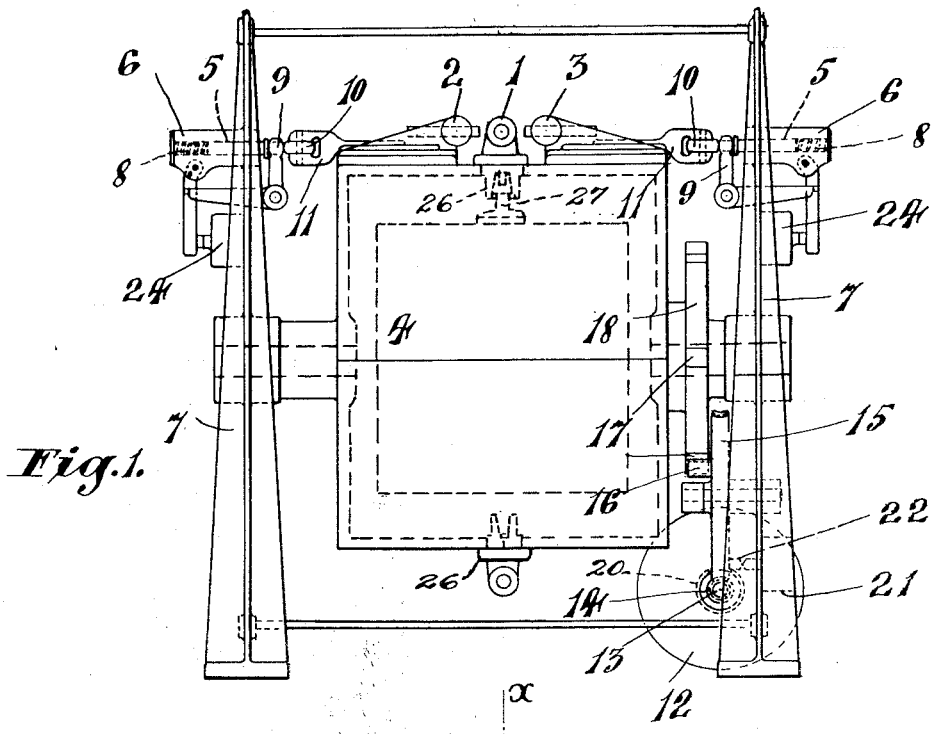
Figure 1 is a front elevation of a machine constructed according to this invention.
Figure 2:
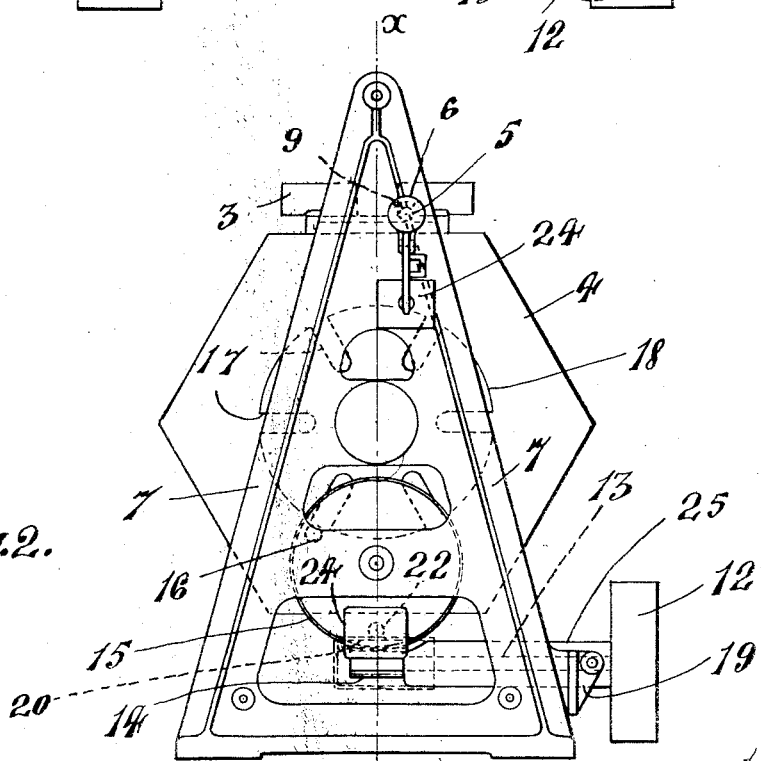
Figure 2 is an end elevation.
Figure 3:
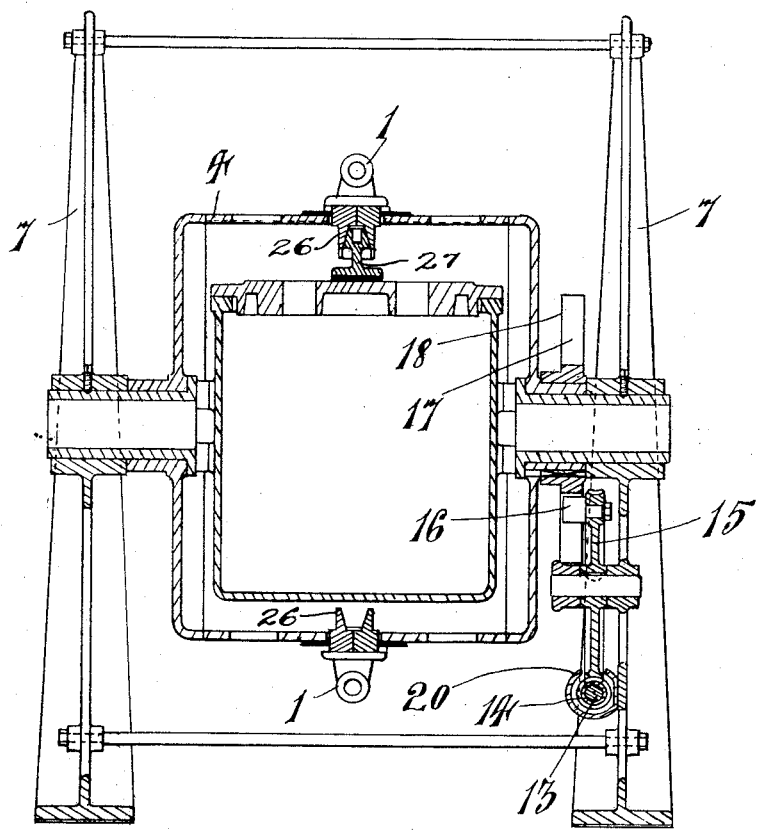
Figure 3 is a central longitudinal cross sectional elevation of a portion of the machine.

According to one form of the invention, a centre part and two outer parts, which are required to be welded together, are carried respectively in jigs 1, 2 and 3. These jigs are mounted on one face of a rotatable drum 4, and similar sets of jigs are mounted on the other faces of this drum. The jigs 2 and 3 are slidably mounted on the drum 4, and are adapted to be forced inwardly to press the two outer parts to be welded against the central part carried by the jig 1. For this purpose plungers or rods 5 are mounted in the brackets 6 carried by the standard 7, and these plungers 5 are normally pressed outwardly of the brackets 6 by the springs 8. The outer ends of the plungers pass between the forked ends of the levers 9 and bear against the insulated rollers 10 carried by the forked members 11 on the jigs 2 and 3. The drum 4 is rotatably mounted in the standards 7, and is driven by power through the medium of the pulley 12, shaft 13, and worm 14. The worm 14 is in mesh with the worm wheel 15, which carries a pin 16 adapted to engage in the slots 17 in the disc 18 fixed to the drum 4. For each rotation of the worm wheel 15, therefore, the pin 16 enters a slot 17 and thus rotates the drum, in this particular machine, through one sixth of a revolution. The shaft 13 is mounted in a sleeve 25, which is pivotally mounted on the bracket 19. The pin 16, after turning the drum 4 to bring the required set of jigs in position for the welding operation, is adapted to contact with the extension 20 of the sleeve 25 to pivot such sleeve and move the worm 14 out of mesh with the worm wheel 15.

Figure 4:
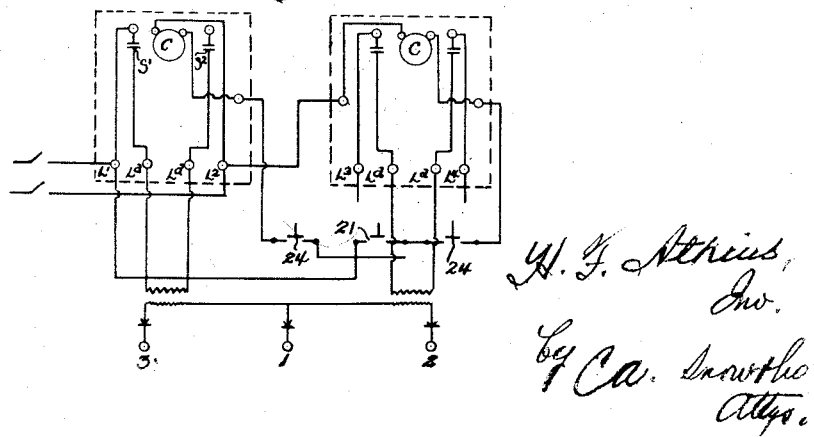
Figure 4 is a diagram showing the switch connections for the welding machine.

After one welding operation the drum 4 is moved to allow the worm 14 to engage the worm wheel 15 to cause the drum to be rotated with the next set of jigs in position for the welding operation as shown by Figure 1. When moving into this position the wheels 10 bear against the plungers 5 and the forked ends of the levers 9 which consequently enable the spring pressed plungers 5 to move the jigs 2 and 3 inwards and press the parts to be welded together. Two transformers, located either inside or outside the machine, have their secondary terminals connected to the jigs 1, 2 and 3, respectively, by rubbing contacts 26 and 27, when such jigs have been moved into the welding position. The switch 21 connects the primary circuit of both said transformers, and as the worm wheel 15 continues its motion after moving the drum into place with the jigs in position for welding, a projection 22 on the worm wheel switches on the current at the switch 21, after which the said worm is moved out of mesh with the worm wheel. The primary current having thus been switched on at the switch 21 the secondary current from the two transformers passes through the central jig 1 to the jigs 2 and 3 respectively, thus causing the junctions of the said parts to be welded to rise to the requisite temperature. When this temperature is reached the metal fuses and the spring plungers 5 force the three parts to be welded together. When this stage is reached, owing to the shortening of the three parts the jigs 2 and 3 move inwards under the action of the spring pressed plungers and the levers 9 are also moved to operate the switches 24 to break the primary circuit of each transformer separately. The diagram Figure 4 shows the switch connections for the welding machine. Two automatic switches are shown each fed from one phase. The first phase is connected to $L_1$ and $L_2$, the second to $L_3$ and $L_4$, the primaries of the welding transformers being connected respectively to the points "Ld". Taking the left-hand switch on the diagram, the current passes through $L_1$ to the automatic contact $S_1$ and out to the load. It returns from the load through the other automatic contact $S_2$. These automatic contacts are closed by the solenoid C, which is across the mains but has the "stop" and "start" switches 21 and 24 in series with it. Thus when the current is put on to $L_1$ and $L_2$, $S_1$ and $S_2$ remain open until both the "stop" switch 24 and the starting switch 21 have been closed by the rotation of the machine. Welding then takes place, and as the jigs close on the weld under the pressure of the springs the "stop" switch 24 is opened when the weld is complete; this opens coil C and consequently $S_1$ and $S_2$, which thus cut off the current from that transformer. The other switch is similar, but the two together are so arranged that, by the travelling of the jigs, each is cut off independently of the other, so that each weld can take place without reference to the other.

Claims:

1. An electric welding machine comprising a central jig for holding one part to be welded, two outer slidably mounted jigs for holding outer parts to be welded, means for pressing the slidably mounted jigs toward the central jig, which allow the slidably mounted jigs to move toward the central jig when the joints fuse, means for passing a current through a single part or an electrode formed by the central jig through a portion of the central part and through one of the outer parts to an electrode formed by the outer jig, for welding only the joint of said central part to the said one of the outer parts, means for passing another current through the said single part or electrode formed by the central jig through a different portion of the said central part and through the other of the outer parts to an electrode formed by the other of the outer jigs for welding only the joint of said central part to the said latter outer part, and automatic means for independently breaking the circuit of each current by the movement of the slidably mounted jigs on completion of the welded joints.

2. An electric welding machine comprising a central jig for holding one part to be welded, two outer slidably mounted jigs for holding outer parts to be welded, spring pressed plungers for pressing the slidably mounted jigs towards the central jig which allow the slidably mounted jigs to move toward the central jig when the joints fuse, means for passing a current through the central part to one of the outer parts for welding only the joint of said central part to the said one of the outer parts, means for passing another current through the said central part to the other of the outer parts for welding only the joint of said central part to the said latter outer part, and a lever operated by the spring pressed plunger on the movement of each outer jig, allowed by the fusion of the metal at the joint, for breaking the circuit of the current on completion of the welding of the respective joint.

3. An electric welding machine comprising a plurality of sets of central and outer slidably mounted jigs carried on a rotatable drum, means for pressing the slidably mounted jigs towards the central jig, means for pressing a current through the central part to one of the outer parts and another current through the said central part to the other of the outer parts, means for placing each set of jigs in the circuits of the said currents.

4. An electric welding machine comprising a plurality of sets of central and outer slidably mounted jigs carried on a rotatable drum, means for rotating the drum for successively placing each set of jigs in position for the welding operation, means for pressing the slidably mounted jigs toward the central jig, and means co-acting with the slidably mounted jigs for independently breaking each circuit.

5. An electric welding machine comprising a plurality of sets of central and outer slidably mounted jigs carried on a rotatable drum and adapted to be successively placed in position for the welding operation, a worm wheel carrying a pin, a disc carried by the drum having radial slots for engagement by such pin, a worm mounted on a driving shaft carried by a pivotally mounted bracket, means carried by the worm wheel for switching on the primary circuit of two transformers, means carried by the worm wheel for moving the worm out of engagement with the worm wheel, and means for breaking separately the primary circuit of each transformer.

In witness whereof I have signed this specification.

HARRY FREDERICK ATKINS.